US012716858B2

(12) United States Patent
Wittkopf et al.

(10) Patent No.: US 12,716,858 B2
(45) Date of Patent: Aug. 25, 2026

(54) THREE-DIMENSIONAL PRINTED SENSORS

(71) Applicant: Peridot Print LLC, Palo Alto, CA (US)

(72) Inventors: Jarrid Wittkopf, Palo Alto, CA (US); Eric Luna-Ramirez, Palo Alto, CA (US); Kristopher J. Erickson, Palo Alto, CA (US); James William Stasiak, Palo Alto, CA (US)

(73) Assignee: PERIDOT PRINT LLC, Palo Alto, CA (US)

(*) Notice: Subject to any disclaimer, the term of this patent is extended or adjusted under 35 U.S.C. 154(b) by 295 days.

(21) Appl. No.: 18/019,703

(22) PCT Filed: Aug. 3, 2020

(86) PCT No.: PCT/US2020/044786

§ 371 (c)(1),
(2) Date: Feb. 3, 2023

(87) PCT Pub. No.: WO2022/031265

PCT Pub. Date: Feb. 10, 2022

(65) Prior Publication Data

US 2023/0296547 A1 Sep. 21, 2023

(51) Int. Cl.
*G01N 27/22* (2006.01)

(52) U.S. Cl.
CPC ......... *G01N 27/227* (2013.01); *G01N 27/223* (2013.01)

(58) Field of Classification Search
CPC .... G01N 27/227; G01N 27/223; B33Y 80/00; B33Y 50/02
See application file for complete search history.

(56) References Cited

U.S. PATENT DOCUMENTS

| | | | | |
|---|---|---|---|---|
| 4,282,480 | A | 8/1981 | Fujito | |
| 5,485,747 | A | 1/1996 | Antikainen et al. | |
| 2006/0186901 | A1 | 8/2006 | Takura et al. | |
| 2013/0320467 | A1 | 12/2013 | Buchanan et al. | |
| 2016/0198576 | A1 | 7/2016 | Lewis et al. | |
| 2017/0221648 | A1* | 8/2017 | Rolin | H01G 11/84 |
| 2017/0238870 | A1* | 8/2017 | Lee | A61B 5/6807 |
| 2017/0315000 | A1 | 11/2017 | Wen et al. | |
| 2017/0350846 | A1* | 12/2017 | Cook | G01N 31/222 |
| 2018/0014486 | A1 | 1/2018 | Creechley et al. | |
| 2018/0056302 | A1 | 3/2018 | Ahmad et al. | |
| 2018/0141274 | A1* | 5/2018 | Fink | H05K 5/065 |
| 2018/0272607 | A1* | 9/2018 | Chaffins | B28B 1/001 |
| 2019/0122584 | A1* | 4/2019 | McAlpine | C09D 11/30 |
| 2019/0134898 | A1* | 5/2019 | Zhao | B33Y 70/10 |

(Continued)

*Primary Examiner* — Feba Pothen
(74) *Attorney, Agent, or Firm* — Michael Dryja

(57) ABSTRACT

In one example in accordance with the present disclosure, a three-dimensional (3D) printed sensor system is described. The 3D printed sensor system includes a 3D printed object. The 3D printed sensor system also includes a 3D printed sensor on a body of the 3D printed object. The 3D printed sensor includes a dielectric region disposed between electrodes. A capacitance of the dielectric region is indicative of an environmental condition of the 3D printed object. The 3D printed sensor system also includes a controller integrated with the body of the 3D printed object. The controller is to measure a capacitance of the 3D printed sensor.

14 Claims, 10 Drawing Sheets

(56) References Cited

U.S. PATENT DOCUMENTS

| | | | | |
|---|---|---|---|---|
| 2019/0148170 | A1* | 5/2019 | Hussain | H01L 23/5389 361/749 |
| 2019/0156647 | A1* | 5/2019 | Farooqui | G08B 19/00 |
| 2019/0360870 | A1 | 11/2019 | Wu et al. | |
| 2020/0088589 | A1 | 3/2020 | Kabany | |
| 2020/0132616 | A1* | 4/2020 | Pierre | G01N 27/605 |

* cited by examiner

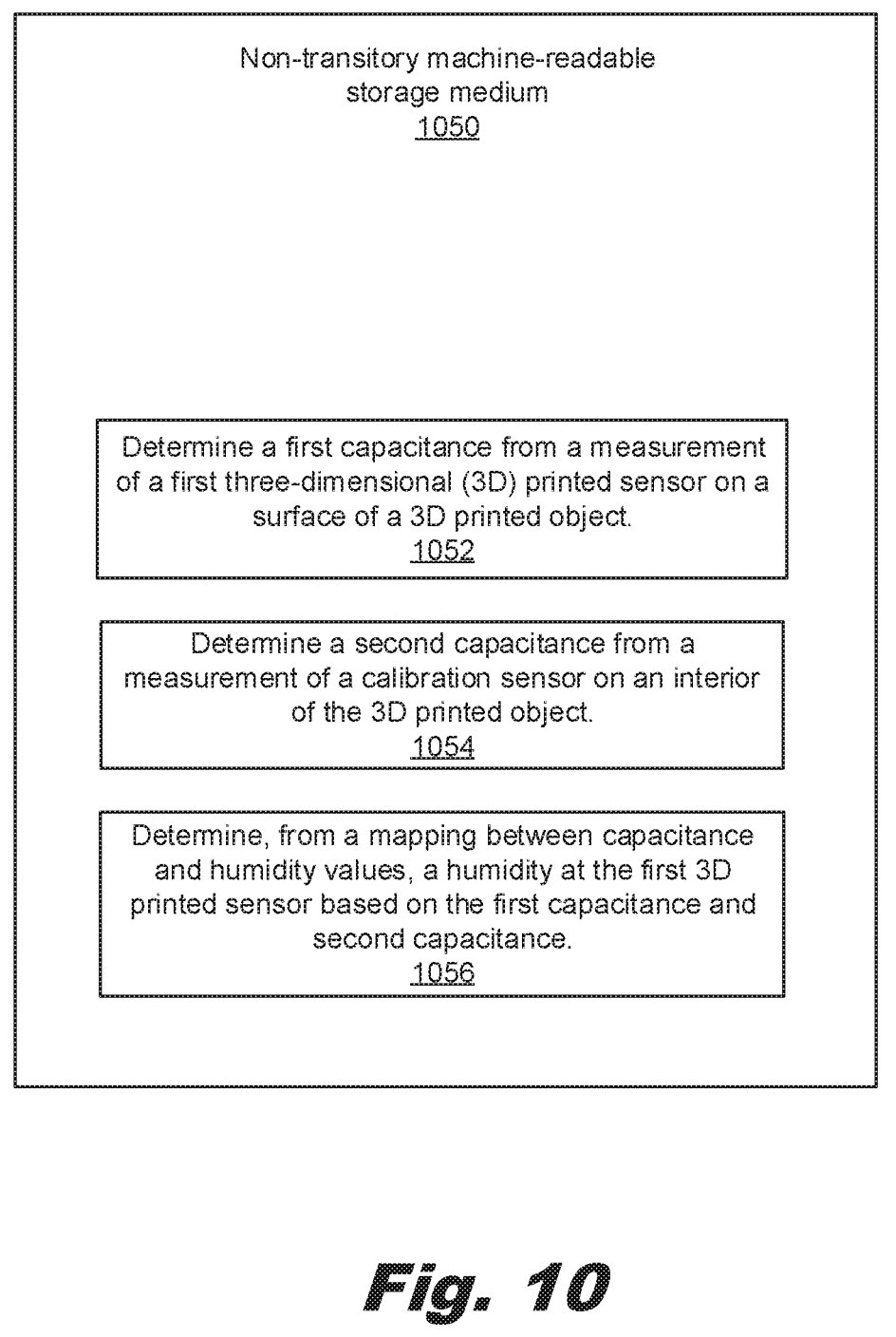

Non-transitory machine-readable storage medium
1050

Determine a first capacitance from a measurement of a first three-dimensional (3D) printed sensor on a surface of a 3D printed object.
1052

Determine a second capacitance from a measurement of a calibration sensor on an interior of the 3D printed object.
1054

Determine, from a mapping between capacitance and humidity values, a humidity at the first 3D printed sensor based on the first capacitance and second capacitance.
1056

*Fig. 10*

THREE-DIMENSIONAL PRINTED SENSORS

BACKGROUND

Additive manufacturing systems produce three-dimensional (3D) objects by building up layers of material. Some additive manufacturing systems are referred to as "3D printing devices" and use inkjet or other printing technology to apply some of the manufacturing materials. 3D printing devices and other additive manufacturing devices make it possible to convert a computer-aided design (CAD) model or other digital representation of an object into the physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 10 depicts a non-transitory machine-readable storage medium for determining humidity from a 3D printed sensor, according to an example of the principles described herein.

Figure 1:
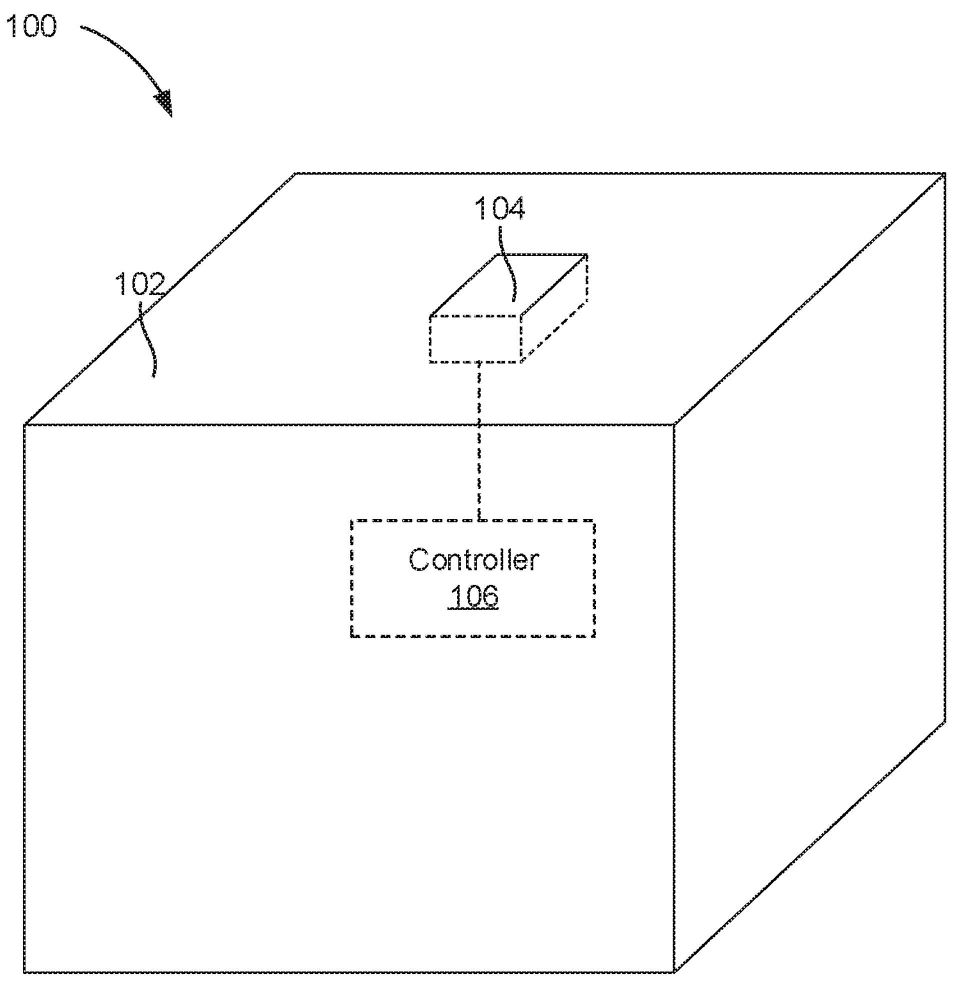
FIG. 1 is a diagram of a 3D printed sensor system according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing systems form a three-dimensional (3D) object through the solidification of layers of build material. Additive manufacturing systems make objects based on data in a 3D model of the object generated, for example, with a computer-aided drafting (CAD) computer program product. The model data is processed into slices, each slice defining portions of a layer of build material that are to be solidified.

In one example, to form the 3D object, a build material, which may be powder, is deposited on a bed. A fusing agent is then dispensed onto portions of a layer of build material that are to be fused to form a layer of the 3D object. The system that carries out this type of additive manufacturing may be referred to as a powder and fusing agent-based system. The fusing agent disposed in the desired pattern increases the energy absorption of the layer of build material on which the agent is disposed. The build material is then exposed to energy such as electromagnetic radiation. The electromagnetic radiation may include infrared light, ultraviolet light, laser light, or other suitable electromagnetic radiation. Due to the increased heat absorption properties imparted by the fusing agent, those portions of the build material that have the fusing agent disposed thereon heat to a temperature greater than the fusing temperature for the build material.

Accordingly, as energy is applied to a surface of the build material, the build material that has received the fusing agent, and therefore has increased energy absorption characteristics, fuses while that portion of the build material that has not received the fusing agent remains in powder form. Those portions of the build material that receive the agent and thus have increased heat absorption properties may be referred to as fused portions. By comparison, the applied heat is not so great so as to increase the heat of the portions of the build material that are free of the agent to this fusing temperature. Those portions of the build material that do not receive the agent and thus do not have increased heat absorption properties may be referred to as unfused portions.

Accordingly, a predetermined amount of heat is applied to an entire bed of build material, the portions of the build material that receive the fusing agent, due to the increased heat absorption properties imparted by the fusing agent, fuse and form the object while the unfused portions of the build material are unaffected, i.e., not fused, in the presence of such application of thermal energy. This process is repeated in a layer-wise fashion to generate a 3D object. The unfused portions of material can then be separated from the fused portions, and the unfused portions recycled for subsequent 3D formation operations.

Another way of 3D formation selectively applies binder to areas of loose build material. In this example, a "latent" part is prepared inside a build bed filled with build material. The build bed may be transferred to a furnace where a first heating operation removes solvents present in the applied binder. As solvents are removed, the remaining binder hardens and glues together build material to convert the "latent" part into a "green" part. The green part is then removed from the bed. As a result of this operation, residual build material may be caked onto the green parts. It may be desirable to remove residual build material from green parts in a cleaning operation. In some examples, the green parts are loaded into a sintering furnace where applied heat can cause binder decomposition and causes the build material powder particles to sinter or fuse together into a durable solid form.

In yet another example, a laser, or other power source is selectively aimed at a powder build material, or a layer of a powder build material, to form a slice of a 3D printed part. Such a process may be referred to as selective laser sintering. In yet another example, the additive manufacturing process may use selective laser melting where portions of the powder material, which may be metallic, are selectively melted together to form a slice of a 3D printed part. As yet another example, in fused deposition modeling melted build material is selectively deposited in a layer where it cools. As it cools it fuses together and adheres to a previous layer. This process is repeated to construct a 3D printed part.

In yet another example, the additive manufacturing process may involve using a light source to cure a liquid resin into a hard substance. Such an operation may be referred to as stereolithography. While such additive manufacturing operations have greatly expanded manufacturing and development possibilities, further development may make 3D printing a part of even more industries. Accordingly, a device which carries out any of these additive manufacturing processes may be referred to as an additive manufacturing device and in some cases a printer.

While such additive manufacturing operations have greatly expanded manufacturing and development possibilities, further development may make 3D printing a part of even more industries. For example, some objects may include electronic circuitry. In general, it is possible to place the electrical components in surface or socket mounts after the printing is done. This placement process however, may add additional processing operations, time, and cost to the manufacturing process and may be a limitation on the 3D printed object geometry.

Accordingly, the present specification describes the generation of electronic components in the 3D printed object. That is, the present specification describes systems and methods for creating 3D printed capacitors using additive manufacturing operations where the 3D printed capacitors may be used as sensors. These 3D printed sensors may be generated using any number of the aforementioned additive manufacturing devices which allow for the digital control of material and multi-fluid placement in a powder bed. With this, selective control is provided over which parts of the powder will be heated and fused, as well as deliver unique properties to a scale of 10s of microns.

The 3D printed sensors are formed using multiple agents. The agents are the conductive agent, which may be a nanoparticle ink, various fusing agents, and a dielectric agent. As described above, the conductive agent is a metal nanoparticle ink. In an example, the conductive agent may be a dispersed conductive material and/or include a conductive precursor material. The dielectric agent may also include nanoparticles. For example, the dielectric agent may include metal oxide nanoparticles. By utilizing the voxel control of an additive manufacturing process, electronic properties of the addressable voxels in a 3D print are controlled. Using such a process, the conductive regions and dielectric regions of the 3D printed sensor can be generated, thus creating a sensor stack.

In an example, a 3D printed sensor may detect humidity of the environment in which the 3D printed object is found. The 3D printed sensor may be formed on any portion of the 3D printed object. For example, the 3D printed sensor may be formed on a surface of the 3D printed object. In some examples, the 3D printed sensor is formed on the interior of the 3D printed object.

As described above, the 3D printed sensor may detect humidity. That is, the water vapor in an environment may change the capacitance of the 3D printed sensor with greater water content being associated with greater capacitance of the 3D printed sensor. That is, greater environmental humidity may result in greater water content in the dielectric region of the 3D printed sensor. This change in water content results in changes to capacitance for the sensor. In some examples, the porosity of the dielectric region of the 3D printed sensor allows greater infiltration of water vapor into the dielectric region. This infiltration may increase the effective dielectric permittivity of the dielectric region of the sensor by changing the composite from air and build material to water and build material, producing the described increase in capacitance.

Accordingly, using additive manufacturing processes to form a 3D printed sensor with a dielectric region that is porous to water vapor, allows for direct sensor printing, thereby avoiding complications associated with the placement of electronic circuits into printed parts. That is, by forming 3D printed sensors, many manufacturing operations may be simplified, and the overall design of the 3D printed object may be less constrained by reducing the number of placed components and the number of process operations. In fact, the 3D printed sensors may be created and printed without any geometry constraints in the part.

In one example in accordance with the present disclosure, a three-dimensional (3D) printed sensor system is described. The 3D printed sensor system includes a 3D printed object. The 3D printed sensor system also includes a 3D printed sensor on a body of the 3D printed object. The 3D printed sensor includes a dielectric region disposed between electrodes. A capacitance of the dielectric region is indicative of an environmental condition of the 3D printed object. The 3D printed sensor system also includes a controller integrated with the body of the 3D printed object. The controller is to measure a capacitance of the 3D printed sensor.

The present specification also describes a method. The method includes measuring a capacitance of a three-dimensional (3D) printed humidity sensor on a surface of the 3D printed object, wherein a capacitance of a dielectric region of the 3D printed humidity sensor is indicative of a humidity condition of the 3D printed object. The method also includes determining, from a database, a humidity for the 3D printed object based on the capacitance of the 3D printed humidity sensor.

The present specification also describes a non-transitory machine-readable storage medium encoded with instructions executable by a processor. The instructions, when executed by the processor, cause the processor to determine a first capacitance from a measurement of a three-dimensional (3D) printed sensor integrated on a 3D printed object. The instructions also cause the processor to determine a second capacitance from a measurement of a calibration sensor on an interior of the 3D printed object. The processor further is instructed to determine, from a mapping between capacitance and humidity values, a humidity at the 3D printed sensor based on the first capacitance and second capacitance.

Such systems and methods 1) allow for printing of sensors in a 3D printed object; 2) simplify the incorporation of sensors into a 3D printed object by reducing the number of components placed in/on the 3D printed object; 3) reduce the constraints caused from placing lumped sensor components in/on the 3D printed object; and 4) facilitate the printing of the full range of sensors, with these capacitors being oriented in the x-y plane of the 3D printed object, the z-direction, or any orientation within the 3D printed object. However, it is contemplated that the systems and methods disclosed herein may address other matters and deficiencies in a number of technical areas.

Turning now to the figures, FIG. 1 is a diagram of a 3D printed sensor system (100) according to an example consistent with this specification. The 3D printed sensor system (100) includes a 3D printed object (102) which contains a 3D printed sensor (104) and an associated controller (106).

That is, not only is the 3D printed sensor (104) disposed in the 3D printed object, but the controller (106) is as well.

The 3D printed sensor system (100) may be of a variety of types. For example, a 3D printed sensor system (100) may monitor humidity of a product throughout its life from manufacturing through delivery to a retailer, and even use by a consumer. As a particular example, the 3D printed sensor system (100) may track humidity and verify that the product has been kept in a desired environment to maintain its functionality. The 3D printed sensor system (100) may also identify if/when the product was exposed to undesired levels of water vapor. In some examples, the 3D printed sensor system (100) may record humidity and/or water vapor levels in a storage device.

In some examples, the described 3D printed sensor system (100) may be used to detect chemicals. In one specific example, the 3D printed sensor system (100) is designed to detect ethanol. For example, the 3D printed sensor system (100) may be used to detect ethanol on a subject's breath.

In yet another example, the 3D printed sensor system (100) may be used to detect volatile organic compounds. For example, the 3D printed sensor system (100) may determine ethylene levels to detect the ripening of produce.

In yet another example, the 3D printed sensor system (100) may monitor humidity throughout a respiratory cycle. For example, the humidity sensor may measure ambient humidity during inhalation and saturated humidity during exhalation. Humidity throughout a respiratory cycle may indicate information about the user's ventilation cycle. In this example, the humidity sensor may be integrated in a respirator or similar device. Accordingly, as demonstrated the 3D printed sensor system (100) may be tailored to detect a wide variety of environmental conditions.

As described above, the 3D printed sensor (104) may be integrated with the 3D printed object. That is, the 3D printed sensor may be placed within, or on, a 3D printed object (102). The 3D printed object (102) may have a variety of shapes and sizes and may be formed by a variety of additive manufacturing systems. In some examples, the additive manufacturing system is a multi-jet fusion (MJF) additive manufacturing system. In using an additive manufacturing system, the 3D printed sensor (104) may be placed at a variety of locations on the 3D printed object (102). For example, the 3D printed sensor (104) may be located on a corner or on a top surface, etc. of the 3D printed object (102). Similarly, multiple 3D printed sensors (104) may be located at various locations, for example, at corners, along edges, etc. of the 3D printed object (102).

The 3D printed sensor (104) includes a dielectric region located between two electrodes. The dielectric region may be composed of a polymer such as polyamide 12 (PA12). The dielectric region may be doped with a compound with a greater dielectric constant than the polymer, for example, barium titanate, $BaTiO_3$. Doping the dielectric region with a high dielectric material provides greater capacitance in a 3D printed sensor (104) of a given size and geometry. Doing so may increase the sensitivity of the 3D printed sensor (104). While particular reference is made to particular materials, the 3D printed sensor (104) may be made of a variety of materials.

The dielectric region is formed to allow water vapor or another chemical compound to enter into the dielectric region and modify the properties of the dielectric region. Specifically, the porosity of the dielectric region may be selected to increase water or other chemical compound infiltration. The porosity and susceptibility to infiltration of the dielectric region, for example of water, makes the dielectric region sensitive to that compound. That is the dielectric region properties change based on the presence of that compound. Accordingly, the 3D printed sensor (104) can generate an output indicative of that compound.

As a specific example, the presence of water in the dielectric region modifies the properties of the dielectric region and allows detection of the water by measuring the capacitance of the 3D printed sensor (104). Accordingly, the dielectric region may be formed to allow water vapor infiltration by preventing fusion of the build material which makes up the dielectric region. In one example, this includes applying a detailing agent to the dielectric region to cool the dielectric region and prevent complete fusion. In other examples, an amount of fusing agent is modified to prevent complete fusion of the dielectric region.

As such, the dielectric region of the 3D printed sensor (104) may be unfused, partially fused, and/or contain air pockets. In some examples, the dielectric region is produced so as to be infiltrated by a chemical species being measured by the 3D printed sensor (104). For example, the dielectric region may be porous to water to produce a humidity sensor. In this example, water and/or water vapor may infiltrate the dielectric region, producing a shift in properties of the dielectric region and an associated change in capacitance of the 3D printed sensor (104). Similar principles may be applied to other chemicals by providing them with the ability to infiltrate the dielectric region. That is, the dielectric region may be open to infiltration by other chemical compounds such that the 3D printed sensor (104) may detect the presence and quantity of the chemical compounds.

As used in the present specification, partially fused may indicate that the dielectric region is fused to a lesser extent than the electrodes of the 3D printed sensor (104). Such partial fusing may indicate that the dielectric region received less fusing agent and/or less fusing energy. By comparison, an unfused dielectric region may not have received any fusing agent such that it remains as raw powder build material. Fully fused powder build material is less porous to water and/or chemical infiltration. Therefore, were the dielectric region to be fully-fused, it would have a reduced ability to receive water vapor and would thus be less sensitive to humidity. That is, if water cannot infiltrate the dielectric region, the dielectric capacitance may remain constant with the presence of water and not change properties with humidity. Accordingly, the dielectric region may be partially fused, unfused, porous, etc. in order to provide the desired sensitivity of the 3D printed sensor (104). In an example, the dielectric region includes at least one of unfused build material and under-fused build material.

In some examples, the dielectric region includes air pockets, which as described above affect the porosity of the dielectric region to an infiltrating compound such as water and/or other chemical compounds. Accordingly, the dielectric region may include air pockets to increase the porosity of the dielectric region thereby increasing the sensitivity of the 3D printed sensor (104).

In some examples, the chemical sensitivity of the 3D printed sensor (104) may be a function of ligands deposited in the dielectric region of the 3D printed sensor (104). Accordingly, different ligands may be used to provide sensitivity to different species or categories of chemicals depending on the tails of the ligands. The absorption of the chemicals associated with the tails of the ligands may produce a shift in properties of the dielectric region of the 3D printed sensor (104). Selecting a type of ligand therefore may be associated with providing a chemical sensitivity to the associated species. In an example, the 3D printed sensor system (100) includes a dielectric region of the 3D printed sensor (104) which absorbs a non-water chemical and wherein absorption of the non-water chemical produces a change in the capacitance of the dielectric region. This change in capacitance of the dielectric region allows detection of the non-water chemicals.

The 3D printed sensor (104) also includes electrodes. In some examples, the electrodes may be planar electrodes. In other examples, the electrodes may be non-planar electrodes. In yet another example, the electrodes may be interdigitated electrodes. In yet another example, the electrodes are curved to be parallel with, or conform to a surface of the 3D printed object (102). The 3D printed sensor (104) may be formed on a surface of the 3D printed object (102) and follow a contour of a curved surface of the 3D printed object (102). Accordingly, the 3D printed sensor (104) may be sized and positioned based on the specific geometric properties of the 3D printed object (102) on which it is found. Thus, the present 3D printed sensor system (100) provides flexibility which may not be found in a sensor or capacitor which is attached subsequently to the 3D printed object (102). For example, a 3D printed sensor (104) may be formed inside the 3D printed object (102). Placing the 3D printed sensor (104) anywhere on, or in, a 3D printed object (102) provides great flexibility in customizing a 3D printed sensor system (100). In some examples, the 3D printed sensor (104) is formed at the same time as the 3D printed object (102).

The 3D printed sensor system (100) also includes a controller (106). In some examples, the controller (106) controls measurement of the 3D printed sensor (104). For example, the controller (106) may receive and process the measurement of capacitance of the 3D printed sensor (104). In some examples, the controller (106) may include an identification number, for example a serial number, to track the associated 3D printed object (102). As such, the 3D printed sensor (104) could be used to track the environmental conditions of the associated product. For example, the humidity level of a 3D printed object (102) could be tracked during shipping to verify that the humidity level remained below a given threshold. Similarly, if the humidity exceeded the threshold, the time and/or location could be recorded to facilitate determining when the 3D printed object (102) was over the threshold. In some examples, the 3D printed sensor (104) is associated with a storage device which retains humidity measurements from the 3D printed sensor (104).

In summary, the 3D printed sensor (104) response to humidity may be defined in part by its physical characteristics and the manufacturing process to generate the 3D printed sensor (104). Accordingly, the controller (106) may consult a database or other information store to determine what those physical properties and manufacturing processes are such that an accurate output of a humidity measurement may be made based on a received capacitance value.

The controller (106) is electrically connected to the 3D printed sensor (104). In some examples, the controller (106) is electrically connected to a plurality of 3D printed sensors (104). As described above, the controller (106) measures a capacitance of the 3D printed sensor (104). In some examples, the controller (106) also determines a humidity based on the measured capacitance. That is, the controller (106) may include or reference a database that includes a mapping between capacitance and humidity. When a capacitance value is received, the controller (106) may consult the database and determine and output the associated humidity value.

In some examples, the controller (106) compares a measured capacitance with a control capacitance to evaluate the humidity. In some examples, the use of a control capacitance improves an accuracy of the controller (106) in determining humidity. The control capacitance may be a measure of the dry capacitance. In other words, the control capacitance may be a measure of the capacitance of the 3D printed sensor (104) when the 3D printed sensor (104) is in a dry state. In other examples, the control capacitance is based on a calibration sensor, which calibration sensor may be internal to the 3D printed object (102). That is, while the 3D printed sensor (104) is disposed on a surface, the calibration sensor may be placed inside the 3D printed object (102) so that the calibration sensor is less impacted by environmental conditions, e.g., humidity. As the calibration sensor is less sensitive to the environmental condition, it serves as a control capacitance value.

As has been described, the controller (106) may determine a humidity based on a measured capacitance from a 3D printed sensor (104). In a similar fashion, the controller (106) may determine a humidity based on measured capacitance from multiple 3D printed sensors (104). In an example, the controller (106) is to transmit the capacitance of the 3D printed sensor (104).

In some examples, the controller (106) may be attached to an amplifier. The amplifier may amplify the signal from the 3D printed sensor (104). In some examples, the amplifier is used to increase the gain of a signal from the 3D printed sensor (104). The amplifier may be a differential amplifier. The amplifier may amplify a difference between the capacitance of the 3D printed sensor (104) and a stored value. The amplifier may amplify a difference between the capacitance of the 3D printed sensor (104) and a calibration sensor. In an example, the amplifier is internal to the 3D printed object (102). In other examples, the amplifier is connected to the 3D printed object (102), for example, through a port on the 3D printed object (102).

In one example, the 3D printed sensor system (100) provides sensor measurements for a larger analysis system. That is, the sensor measurements may be processed to identify information about additional environmental conditions. For example, a 3D printed object (102) may include a plurality of 3D printed sensors (104) on the surface, each to determine a humidity. From these measurements, the controller (106) or another computing device may determine wind speed and direction based on the measurements of the various 3D printed sensors (104).

Figure 2:
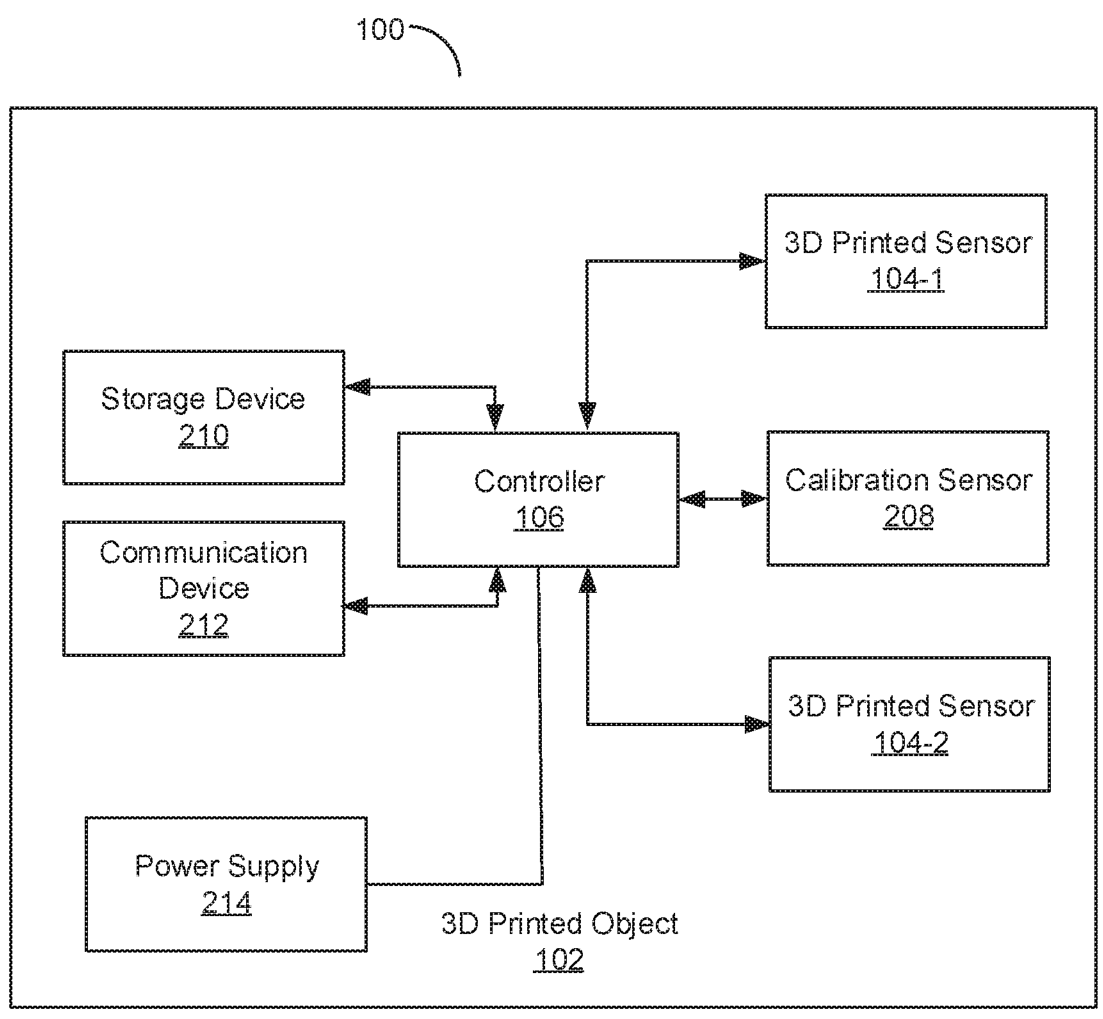
FIG. 2 is a block diagram of a printed 3D sensor system according to an example of the principles described herein.

FIG. 2 is a block diagram of a 3D printed sensor system (100) according to an example of the principles described herein. The 3D printed sensor system (100) may include a controller (106) in communication with multiple 3D printed sensors (104-1, 104-2). That is, the controller (106) may receive calibration information from the 3D printed sensors (104). The controller (106) may also apply voltages to the electrodes of the 3D printed sensors (104) such that a capacitance may be measured. The controller (106) also communicates with a calibration sensor (208). In some examples, the 3D printed sensor system (100) may include a storage device (210) and/or a communication device (212). The 3D printed sensor system (100) may include a power supply (214). In some examples, the power supply (214) may be external to the 3D printed object (102). However, in other examples, the power supply (214) may be internal to the 3D printed object (102), such as a battery, which battery may be re-charged from an external component.

In the example depicted in FIG. 2, there are multiple 3D printed sensors (104-1, 104-2) in the 3D printed sensor system (100). These 3D printed sensors (104) may be independently operated. The output of the multiple 3D printed sensors (104) may be combined to generate a reading. In some examples, each of the multiple 3D printed sensors (104-1, 104-2) provide separate capacitance measurements, which multiple measurements are converted independently to provide multiple humidity measurements. In other examples, the 3D printed sensor (104) outputs are averaged and combined to generate a single humidity measurement. In some examples, differences in outputs of the 3D printed sensors (104) are used to determine properties besides humidity. For example, from the multiple humidity measurements, an airflow across the 3D printed object (102) may be determined. In yet other examples, the 3D printed sensors (104) are used to determine an orientation of the 3D printed object (102) in an airflow. For example, some 3D printed sensors (104) may be located in static zones, for example, at the front or rear of the 3D printed object (102) while other 3D printed sensors (104) may be located on the sides of the 3D printed object (102) where there is a narrow boundary layer. Due to the narrow boundary layer, the humidity may be decreased on the sides as compared with the front or back of the 3D printed object (102). This difference may be used to determine the airflow and/or the 3D printed object (102) orientation within the airflow. Accordingly, the 3D printed sensors (104) may be used to determine information beyond the chemical concentration of a species which interacts with the dielectric region.

In one example, the 3D printed object (102) includes a calibration sensor (208). The calibration sensor (208) may be a 3D printed sensor (104) located internally in the 3D printed object (102). As the calibration sensor (208) is on the inside of the 3D printed object (102), environmental conditions such as humidity may not affect the calibration sensor (208) to the same extent that they affect the 3D printed sensors (104) on the surface. That is, the environmental conditions may not impact the capacitance of the calibration sensor (208). Accordingly, the calibration sensor (208) may serve as a stable reference for the 3D printed sensors (104-1, 104-2) located near a surface.

The calibration sensor (208) may account for certain inaccuracies in the measurements from the 3D printed sensors (104). For example, the 3D printed sensor (104) may exhibit hysteresis. To reduce the impact of hysteresis, the 3D printed sensor (104) output may be compared to the calibration sensor (208).

Accordingly, the calibration sensor (208) output may be used to provide a reference for the 3D printed sensor (104) to be compared against. In some examples, the capacitance value of the 3D printed sensor (104) is compared with the calibration sensor (208). The difference between the calibration sensor (208) and the 3D printed sensor (104) may be used to determine an environmental value, for example, a humidity. That is, the controller (106) may subtract the value of the calibration sensor (208) from the value of the 3D printed sensor (104) and assess the resulting difference.

In some examples, humidity may be a function of multiple 3D printed sensors (104) and multiple calibration sensors (208) in a 3D printed object (102). That is, the controller (106) may interrogate a plurality of 3D printed sensors (104) and the calibration sensor (208) when determining an environmental condition. In an example, the multiple 3D printed sensors (104) are positioned at different depths within the 3D printed object (102) to allow for consideration of the diffusion of the measured species into the 3D printed object (102). Similarly, the 3D printed sensor system (100) may include multiple calibration sensors (208) located at different depths in a 3D printed object (102) to provide calibration for different diffusion distances from the surface.

In some examples, the calibration sensor (208) values are updated over time to account for a drift of the system. Accordingly, a time-based value of the calibration sensor (208) may be used to modify the measured capacitance value for the 3D printed sensor (104). The modified capacitance value of the 3D printed sensor (104) may then be used to calculate a humidity or other environmental property.

In some examples, both the 3D printed sensor (104) and calibration sensor (208) values are compared with reference values stored in the storage device (210). The reference values provide a basis to compare the current capacitance measurements and determine a humidity or other environmental property.

In some examples, the 3D printed sensor system (100) may include a storage device (210). The storage device (210) may record the value of the 3D printed sensor (104) over time. The storage device (210) may be accessible by the controller (106). For example the controller (106) may either calculate the humidity, or pass the measured capacitance to the communication device (212) for transmission to an external device. The storage device (210) may be a machine-readable storage device (210). That is, the controller (106) reads information from the storage device (210) and in some examples may write to the storage device (210). The controller (106) may retrieve information from the storage device (210) when calculating an environmental value.

In some examples, the 3D printed sensor system (100) includes a communication device (212) in communication with the controller (106). The communication device (212) may be used to communicate with an external computing device. Accordingly, the communication device (212) may include an antenna. Specifically, the communication device (212) may include a radio frequency antenna. The communication device (212) may allow the 3D printed object (102) to communicate its identification/tracking number, the measured capacitance, and/or the humidity measurement.

In some examples, the communication device (212) may include a communication line and/or port. This communication line and/or port may be formed in the 3D printed object (102). Accordingly, the communication port may receive a connector from a computing device such that humidity and/or capacitance data may be transferred. The communication device (212) may include a processor and an associated memory.

In some examples, the 3D printed sensor system (100) includes a power supply (214). The power supply (214) provides power to the controller (106). The power supply (214) may provide power to other components of the 3D printed sensor system (100) as well. For example, the power supply (214) may provide power to the storage device (210) and/or the communication device (212). In some examples, the power supply (214) may provide power to these other components indirectly, for example, through the controller (106). In some examples, the power supply (214) may be external to the 3D printed object (102). In other examples, the power supply (214) may be internal to the 3D printed object (102). In an example, the power supply (214) may be a battery. Other suitable power supplies (214) may include a capacitor, a fuel cell, an electrochemical cell, a generator, a photoelectric cell, etc.

Figure 3:
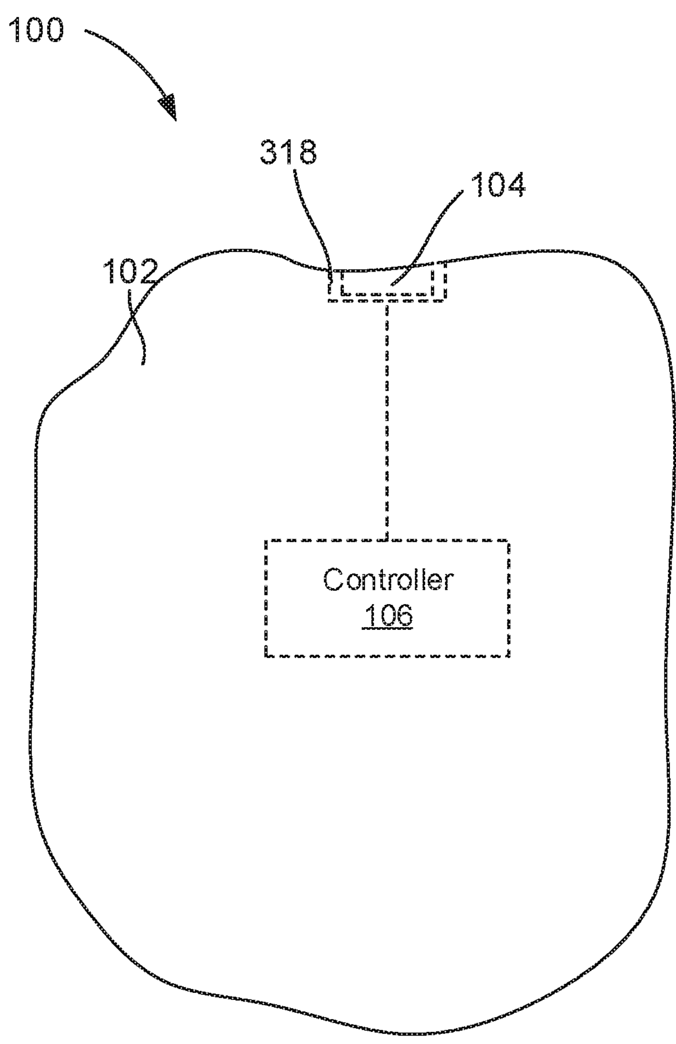
FIG. 3 is a diagram of a 3D printed sensor system according to an example of the principles described herein.

FIG. 3 is a diagram of a 3D printed sensor system (100) according to an example of the principles described herein. In the example depicted in FIG. 3, the 3D printed sensor (104) conforms to the shape of a surface of the 3D printed object and includes a boundary region (318).

As discussed above, the electrodes may be non-planar, for example, the electrodes may be curved or otherwise shaped to conform to the geometry of the 3D printed object (102). The curved electrode may increase the diffusion of a species into the dielectric region of the 3D printed sensor (104).

In some examples, the 3D printed sensor (104) includes a boundary region (318) that surrounds the electrodes and the dielectric region. The boundary region (318) provides an area of modified porosity to enhance diffusion of a measured species into the dielectric region of the 3D printed sensor (104). That is, the boundary region (318) may be formed during production of the 3D printed object (102) to increase the porosity of the boundary region (318) and enhance the speed at which the 3D printed sensor (104) equilibrates with the environment. The boundary region (318) may include unfused build powder, partially fused build powder, porous build material, etc. That is, in some examples, the boundary region (318) is not fully fused. For example, the boundary region (318) may be incompletely fused such that it contains raw build powder and/or air pockets. In some examples, the boundary region (318) may be treated with a detailing agent during production to reduce the temperature in the boundary region (318) to produce the desired porosity. In one example, the detailing agent is water which cools the build area of the boundary region (318) and produces the desired porosity.

As described above, the boundary region (318) may surround the electrodes and dielectric region. However, in some examples, the boundary region (318) covers less than all surfaces of the 3D printed sensor (104). Specifically, the boundary region (318) may cover just a surface-facing side of the 3D printed sensor (104). This may provide the desired porosity without modifying the strength of the interior side of the 3D printed sensor (104).

The boundary region (318) may be produced to absorb a chemical compound which interferes with the 3D printed sensor (104). For example, a sulfur oxide ($SO_x$) 3D printed sensor (104) may be surrounded with a carbon dioxide ($CO_2$) absorbing boundary region (318) to minimize the impact of variation in the $CO_2$ concentration on the operation of the 3D printed sensor (104). Accordingly, the boundary region (318) may provide a stable value for the interfering species by reducing the impact of the interfering species on the 3D printed sensor (104).

Figure 4A:
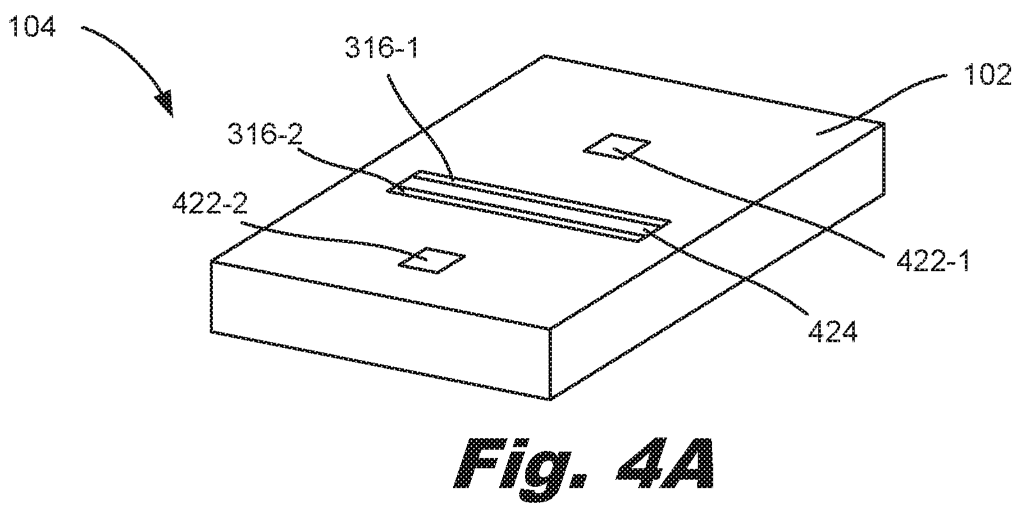
FIGS. 4A-4C are views of a 3D printed sensor according to an example of the principles described herein.
Figure 4B:
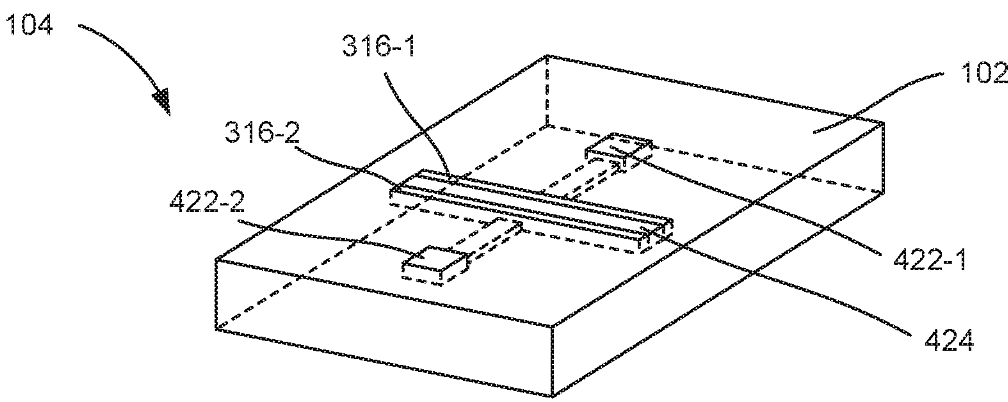
Figure 4C:
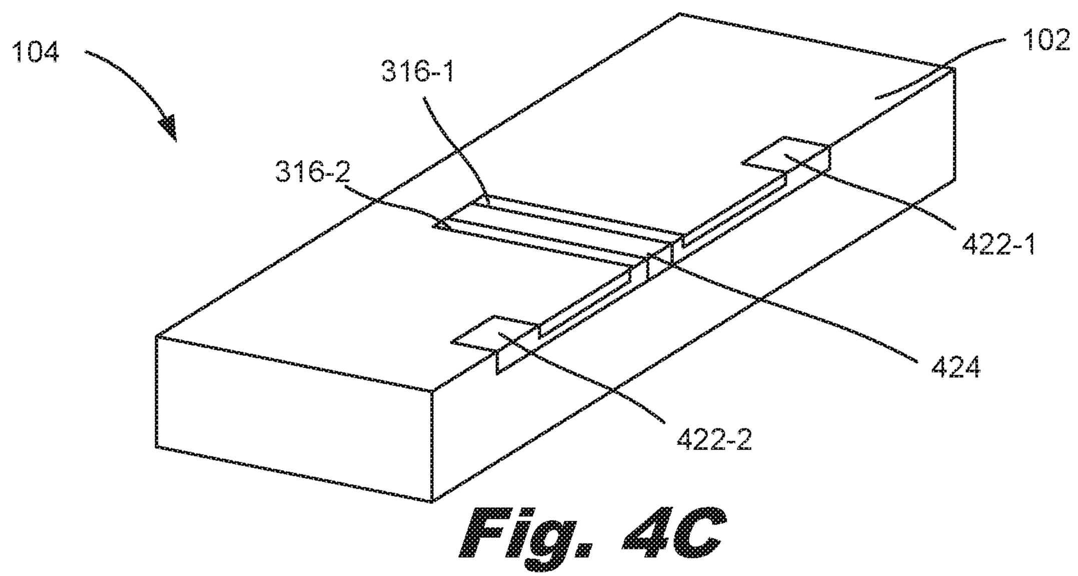

FIGS. 4A-4C are views of an example of a 3D printed sensor (104), according to an example of the principles described herein. Specifically, FIG. 4A is an isometric view of a portion of a 3D printed object (102) that includes the 3D printed sensor (104), FIG. 4B is a transparent view of the 3D printed sensor (104) in the 3D printed object (102), and FIG. 4C is a cut-away view of the 3D printed sensor (104) in the 3D printed object (102).

As described above, to create a 3D printed sensor (104), two electrodes (316-1, 316-2) are separated by a dielectric region (424). These components and regions may have a variety of shapes, sizes, and orientations. Specifically, FIGS. 4A-4C depict a parallel plate 3D printed sensor (104). A 3D printed sensor (104) may be formed to have any variety of sizes, shapes, and orientations and properties of all three examples may be combined to form capacitors that fully utilize the addressable 3D volume of a part.

FIGS. 4A-4C also depict the contacts (422-1, 422-2) that are used to couple the electrodes (316-1, 316-2) to different electrical circuit components. These contacts (422) may couple the electrodes (316) to the controller (FIG. 1, 106). As depicted in FIGS. 4B and 4C, these contacts (422-1, 422-2) are coupled to the electrodes (316-1, 316-2) via electrical traces. While some of the components of the 3D printed sensor (104) are disposed on the surface, others, such as the electrical traces may be sub-surface components.

As described above, different characteristics of these components may affect the capacitance of the 3D printed sensor (104). For example, given the direct proportionality of capacitance to the areas of the electrodes (316-1, 316-2), which in the case of the parallel electrodes (316) is represented by the relationship $C=\varepsilon_r\varepsilon_0 A/d$, where A is the surface area of the electrode (316) area, d is the distance between the two electrodes (316) and may include the dielectric region (424) and any barrier regions, and $\varepsilon_r\varepsilon_0$ is the product of the relative dielectric permittivity of the material and the permittivity of free space, a wide variety of capacitances can be achieved by adjusting area of the electrodes (316) and/or the thickness of the dielectric region (424). While specific reference is made to one configuration of the dielectric region and electrodes, the 3D printed sensor (104) may take different forms. As a specific example, the electrodes (316) and dielectric region (424) may be vertically oriented.

Figure 5:
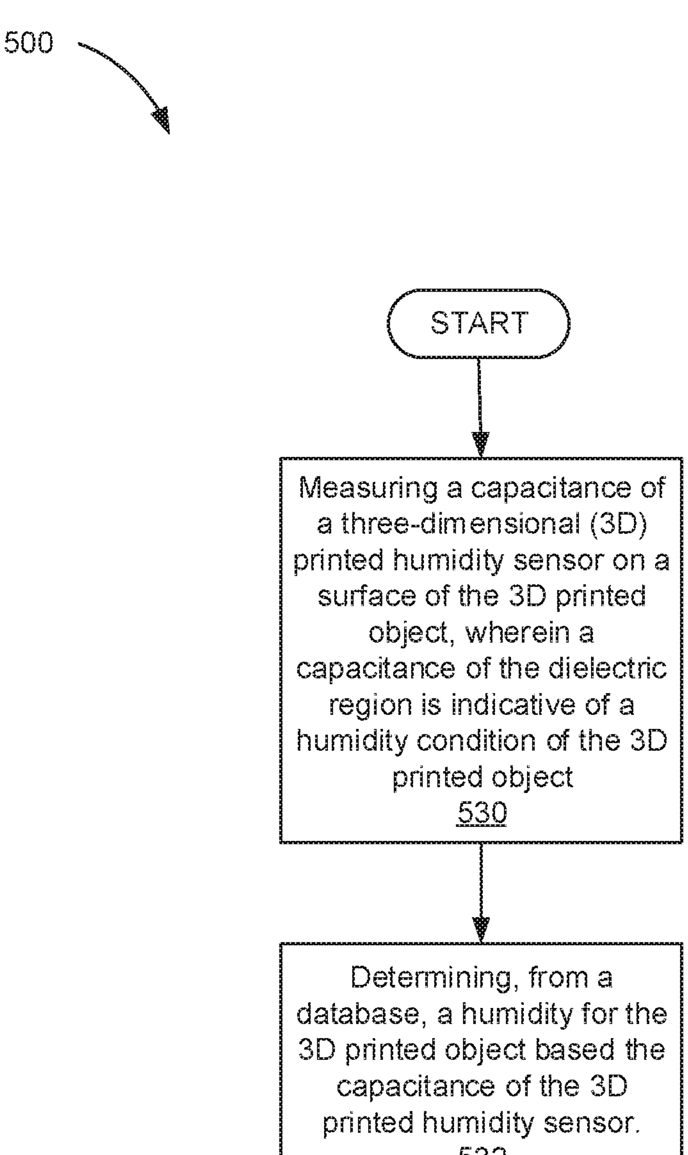
FIG. 5 is a flow chart of a method of determining humidity from a 3D printed sensor according to an example of the principles described herein.

FIG. 5 is a flow chart of a method (500) of determining humidity from a 3D printed sensor (FIG. 1, 104) according to an example of the principles described herein. The method (500) includes measuring (block 530) a capacitance of a three-dimensional (3D) printed sensor (FIG. 1, 104) on a surface of the 3D printed object (FIG. 1, 102), wherein a capacitance of the dielectric region (FIG. 4, 424) is indicative of a humidity condition of the 3D printed object (FIG. 1, 102). As described above, the capacitance is a function of the humidity. For example, the capacitance of the 3D printed sensor (FIG. 1, 104) may increase as humidity increases and the capacitance may decrease as humidity decreases. As a specific example, placing the 3D printed sensor (FIG. 1, 104) in an oven or vacuum may reduce the capacitance. Exposure to air may cause a return of a value reflecting the ambient humidity over time. Similarly, exposure to heated, humid air may increase the capacitance of the 3D printed sensor (FIG. 1, 104). Accordingly, capacitance may be measured and the relationship between capacitance and humidity used to determine the humidity of a 3D printed object (FIG. 1, 102).

The method (500) includes determining (block 532), from a database, a humidity for the 3D printed object (FIG. 1, 102) based the capacitance of the 3D printed humidity sensor (FIG. 1, 104). The database may include a lookup table to determine a humidity based on a capacitance value of the 3D printed sensor (FIG. 1, 104). As described above, the relationship between capacitance and humidity may be based on a variety of factors including a fusing state of the dielectric region (FIG. 4, 424), the build material used in the dielectric region (FIG. 4, 424), etc. Accordingly, the database may be indexed based on these physical properties. As such, when a capacitance value is received, the controller (FIG. 1, 106) determines, based on the properties, the humidity of the environment of the 3D printed object (FIG. 1, 102) based on the received capacitance measurement.

In an example, the database may be in a storage device (FIG. 2, 210) formed in the 3D printed object (FIG. 1, 102). In another example, the database may be external to the printed 3D object (FIG. 1, 102). In some examples, the database may contain values for the 3D printed sensor (FIG. 1, 104) and for a calibration sensor (FIG. 2, 208).

Figure 6:
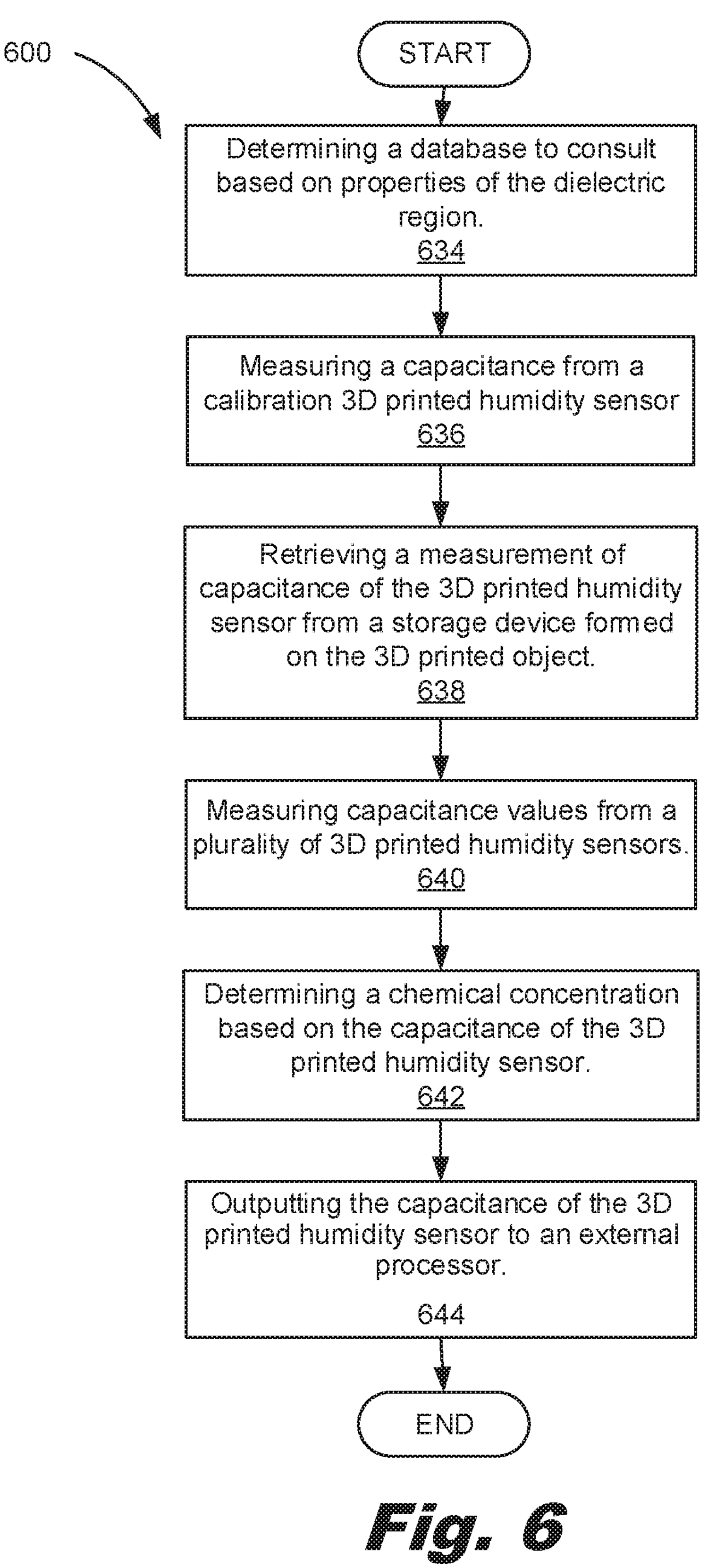
FIG. 6 is a flow chart of a method of determining humidity from a 3D printed sensor according to an example of the principles described herein.

FIG. 6 is a flow chart of a method (600) of determining humidity from a 3D printed sensor (FIG. 1, 104) according to an example of the principles described herein.

The method (600) may include determining (block 634) a database to consult based on properties of the dielectric region (FIG. 4, 424). That is, as described above, the properties of the dielectric region (FIG. 4, 424) may impact the mapping between capacitance and humidity. Accordingly, the controller (FIG. 1, 106) or some other computing device may, based on the properties of the dielectric region (FIG. 4, 424) determine which mapping, i.e., database, to use to convert a capacitance measurement into a humidity measurement. The database selected may depend on the porosity of the dielectric region (FIG. 4, 424), a degree of fusion of the dielectric region (FIG. 4, 424), or other material properties of the dielectric region (FIG. 4, 424), for example, availability to water vapor. Accordingly, the method (600) may include consulting the database based on the properties of the dielectric region (FIG. 4, 424).

The method (600) may include measuring (block 636) a capacitance from a calibration sensor (FIG. 2, 208). As described above, the calibration sensor (FIG. 2, 208) may be internal to the 3D printed object (FIG. 1, 102) and may provide a reference value for the 3D printed sensor (FIG. 1, 104).

The method (600) may include retrieving (block 638) a measurement of capacitance of the 3D printed humidity sensor (FIG. 1, 104) from a storage device (FIG. 2, 210) formed on the 3D printed object (FIG. 1, 102). As described above, the storage device (FIG. 2, 210) may include a database. In some examples, the storage device (FIG. 2, 210) may include measurements from multiple 3D printed sensors (FIG. 1, 104) and calibration sensors (FIG. 2, 208).

The method (600) may include measuring (block 640) capacitance values from a plurality of 3D printed humidity sensors (FIG. 1, 104). The measured capacitances from the plurality of 3D printed humidity sensors (FIG. 1, 104) may be combined to produce a humidity measurement. In one example, the measured capacitances are averaged. In another example, the humidity measurements are determined for each sensor and then the humidity measurements are averaged.

The method (600) may include determining (block 642) a concentration of a chemical compound based on the capacitance of the 3D printed sensor (FIG. 1, 104). That is, in some examples the 3D printed sensor (FIG. 1, 104) may have a dielectric region (FIG. 4, 424) containing a dopant with a selected end group which selected end group may have an affinity for a particular chemical species. As a particular example, the dopant may have a hydrophilic end group such that the dielectric region (FIG. 4, 424) is sensitive to humidity. In another example, the end group may be hydrophobic producing sensitivity to non-aqueous volatile organic species. Accordingly, varying the end group may produce different ligands with different sensitivities to different chemicals such that the 3D printed sensor (FIG. 1, 104) may be tuned to sense different compounds.

The method (600) may include, with the controller (FIG. 1, 106), outputting (step 644) the capacitance of the 3D printed humidity sensor (FIG. 1, 104) to an external processor. That is, the external processor may be located off the 3D printed object (FIG. 1, 102) and be in electrical communication with the controller (FIG. 1, 106).

Figure 7:
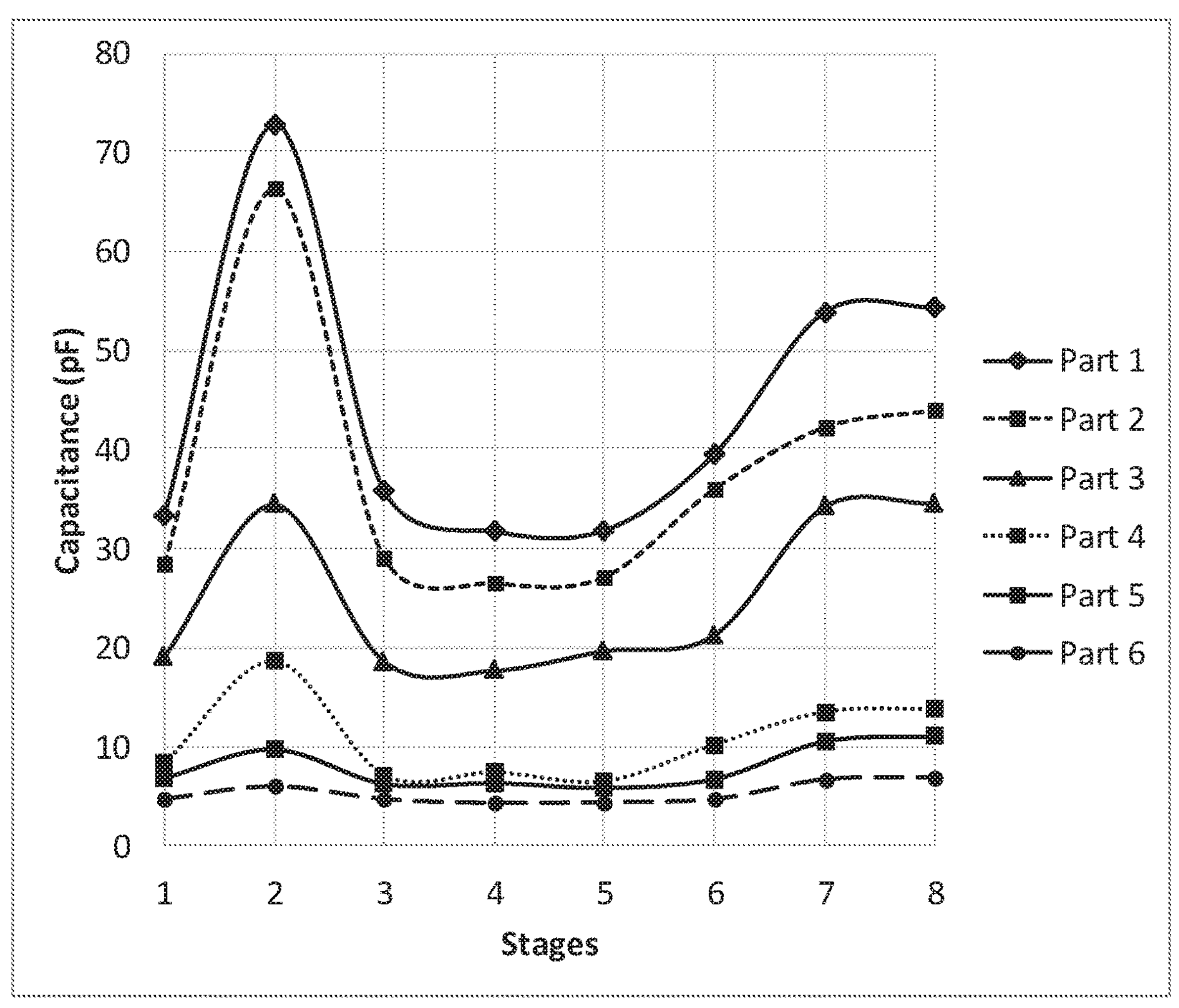
FIG. 7 is a graph depicting the mapping between various humidity states and the measured capacitance of a set of 3D printed sensors according to an example of the principles described herein.

FIG. 7 is a graph depicting the mapping between various humidity states and the measured capacitance of a set of 3D printed sensors (FIG. 1, 104) according to an example of the principles described herein. In a test, a group of 3D printed sensors (FIG. 1, 104) were prepared using a multi-jet fusion additive manufacturing system. The additive manufacturing system deposited silver nanoparticles to form the conductive traces and electrodes (FIG. 3, 316) of the 3D printed sensor (FIG. 1, 104). The additive manufacturing system deposited barium titanate in the dielectric region (FIG. 4, 424) of the 3D printed sensor (FIG. 1, 104). The additive manufacturing system formed the body of the 3D printed object (FIG. 1, 102) using polyamide 12 (PA 12). In FIG. 7, the different lines indicate 3D printed sensors (FIG. 1, 104) with different amounts of barium titanate in the dielectric region. Specifically, Part 1 had the greatest amount of barium titanate and Part 6 had the least amount of barium titanate. Parts 2-5 had intermediate amounts of barium titanate with lower numbered parts having greater amounts of barium titanate. As seen from FIG. 7, increasing the amount of barium titanate has the effect of increasing the capacitance of the sensor and producing a greater response to water vapor.

TABLE 1

| Stage Description | As Made | Air Dry Over-night | Oven Dry 80 C. 1 hour | After 4 days of vac-uum | 2 hr heat at 80 C. in vacuum | Air Dry over-night | Air dry 1 week | Air dry 2nd week |
|---|---|---|---|---|---|---|---|---|
| Stage No. | 1 | 2 | 3 | 4 | 5 | 6 | 7 | 8 |
| Part 1 | 33 | 73 | 36 | 32 | 32 | 40 | 54 | 54 |
| Part 2 | 28 | 66 | 29 | 27 | 27 | 36 | 42 | 44 |
| Part 3 | 19 | 34 | 19 | 18 | 20 | 21 | 34 | 35 |
| Part 4 | 8 | 19 | 7 | 7 | 7 | 10 | 14 | 14 |
| Part 5 | 7 | 10 | 6 | 6 | 6 | 7 | 11 | 11 |
| Part 6 | 5 | 6 | 5 | 4 | 4 | 5 | 7 | 7 |

Table 1 indicates capacitance values as measured in picoFarads for each sensor at different stages of a test. As can be seen in Table 1, oven drying and vacuum both reduce the capacitance of the 3D printed sensors (FIG. 1, 104). Exposure to ambient air, either overnight or for a week, increases the capacitance of the 3D printed sensors (FIG. 1, 104) as a result of the water vapor in the air. Capacitance after the second week was similar to the first week, indicating stabilization of the capacitance value within the first week.

Figure 8:
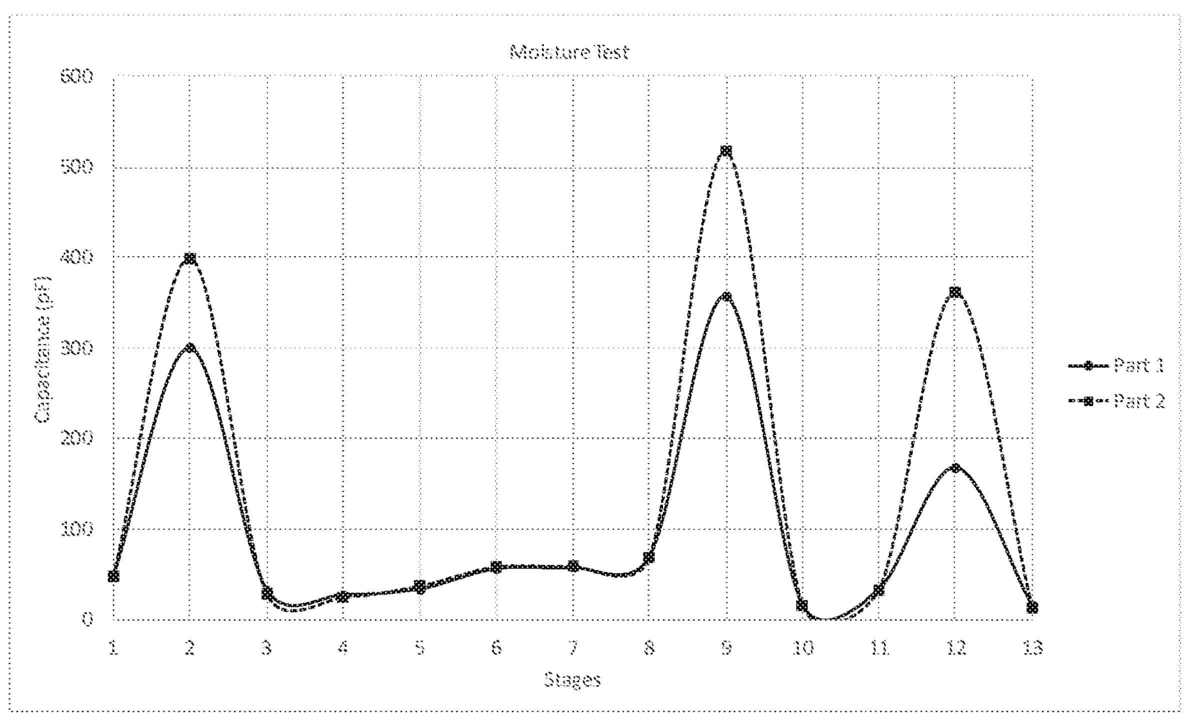
FIG. 8 is a graph depicting the mapping between various humidity states and the measured capacitance of a set of 3D printed sensors according to an example of the principles described herein.

FIG. 8 is a graph depicting the mapping between various humidity states and the measured capacitance of a set of 3D printed sensors (FIG. 1, 104) according to an example of the principles described herein. Specifically, FIG. 8 depicts mappings between capacitance and humidity for two different 3D printed sensors (FIG. 1, 104). In this example, the different 3D printed sensors (FIG. 1, 104) have different amounts of barium titanate in the dielectric region of the sensor.

As with the above test, a group of 3D printed sensors (FIG. 1, 104) were prepared using a multi-jet fusion system. The system deposited silver nanoparticles to form the conductive traces and electrodes (FIG. 3, 316) of the sensor (FIG. 1, 104). The system deposited barium titanate in the dielectric region (FIG. 4, 424) of the sensor (FIG. 1, 104). The system formed the body of the 3D formed object (FIG. 1, 102) using polyamide 12 (PA 12). In this test, Part 1 has a greater amount of barium titanate than part 2.

TABLE 2

| Stage | Description | Capacitance (pF) Part 1 | Capacitance (pF) Part 2 |
|---|---|---|---|
| 1 | Air exposed overnight | 48 | 47 |
| 2 | High humidity test | 300 | 399 |
| 3 | Dried overnight at 60° C. | 33 | 28 |
| 4 | Dried 2 hours at 80° C. in vacuum | 27 | 24 |

TABLE 2-continued

| Stage | Description | Capacitance (pF) Part 1 | Capacitance (pF) Part 2 |
|---|---|---|---|
| 5 | Air exposed overnight | 34 | 37 |
| 6 | Air exposed 1 week | 56 | 58 |
| 7 | Air exposed second week | 57 | 59 |
| 8 | Low humidity test | 69 | 68 |
| 9 | High humidity test | 357 | 517 |
| 10 | Oven dry for 2 hours at 80° C. | 16 | 16 |
| 11 | Air exposed over weekend | 33 | 32 |
| 12 | High humidity test | 168 | 362 |
| 13 | Dried for 2 hours at 80° C. | 15 | 13 |

In Table 2, "High humidity tests" refer to hanging the 3D printed sensor (FIG. 1, 104) over a boiling water bath for 30 minutes. "Low humidity test" refers to placing the 3D printed sensor (FIG. 1, 104) about 6 inches from a boiling water bath for 120 minutes to assure a steady state has been reached. "Air exposed" language refers to exposing the 3D printed sensor (FIG. 1, 104) to ambient exposure. As indicated in Table 2 above, doing so results in increased capacitance due to humidity in the air.

Figure 9:
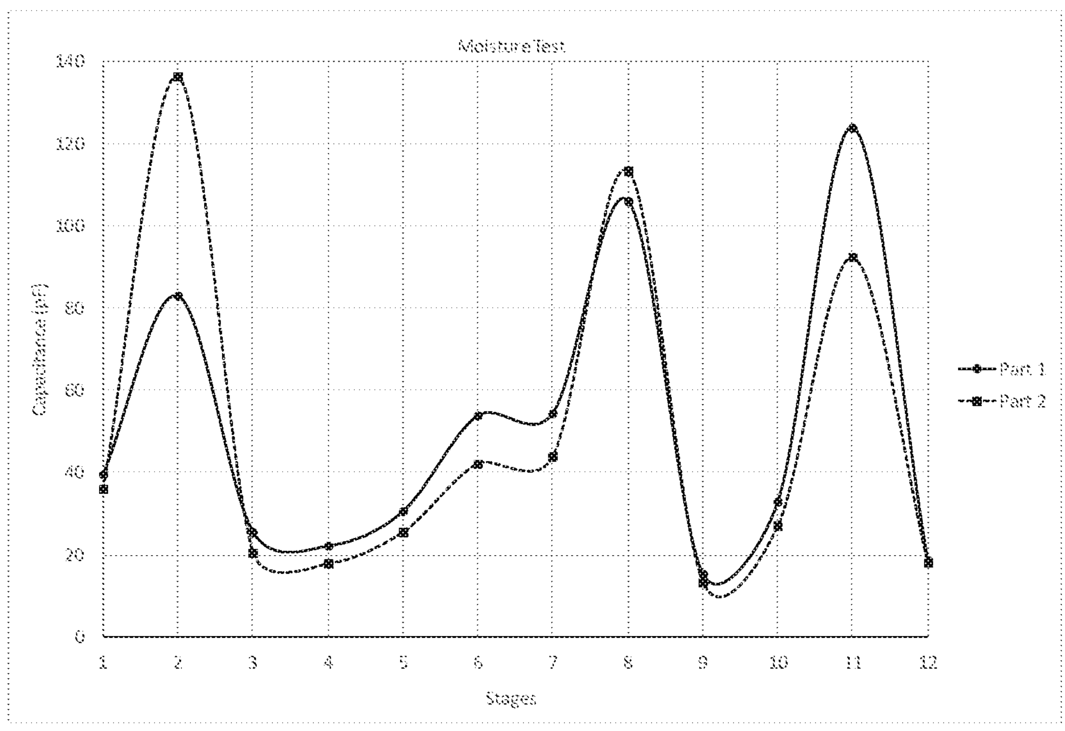
FIG. 9 is a graph depicting the mapping between various humidity states and the measured capacitance of a set of 3D printed sensors according to an example of the principles described herein.

FIG. 9 is a graph depicting the mapping between various water vapor states and the measured capacitance of a set of 3D printed sensors (FIG. 1, 104) according to an example of the principles described herein. A group of sensors (FIG. 1, 104) were prepared using a multi-jet fusion system. The system deposited silver nanoparticles to form the conductive traces and electrodes (FIG. 3, 316) of the sensor (FIG. 1, 104). The system deposited barium titanate in the dielectric region (FIG. 4, 424) of the sensor (FIG. 1, 104). The system formed the body of the 3D formed object (FIG. 1, 102) using polyamide 12 (PA 12). Again, Part 1 has a greater amount of barium titanate than Part 2.

TABLE 3

| Stage | Description | Capacitance (pF) Part 1 | Capacitance (pF) Part 2 |
|---|---|---|---|
| 1 | Air exposed overnight | 40 | 36 |
| 2 | High humidity test | 83 | 136 |
| 3 | Dried overnight at 60° C. | 26 | 21 |
| 4 | Dried 2 hours at 80° C. in vacuum | 22 | 18 |
| 5 | Air exposed overnight | 31 | 26 |
| 6 | Air exposed 1 week | 54 | 42 |
| 7 | Air exposed second week | 55 | 44 |
| 8 | High humidity test | 106 | 114 |
| 9 | Oven dry for 2 hours at 80° C. | 15 | 13 |
| 10 | Air exposed over weekend | 33 | 27 |
| 11 | High humidity test | 124 | 92 |
| 12 | Dried for 2 hours at 80° C. | 19 | 18 |

FIG. 10 depicts a non-transitory machine-readable storage medium (1050) for determining humidity from a 3D printed sensor (FIG. 1, 104), according to an example of the principles described herein. To achieve its desired functionality, a computing system includes various hardware components. Specifically, a computing system includes a processor and a machine-readable storage medium (1050). The machine-readable storage medium (1050) is communicatively coupled to the processor. The machine-readable storage medium (1050) includes a number of instructions (1052, 1054, 1056) for performing a designated function. The machine-readable storage medium (1050) causes the processor to execute the designated function of the instructions (1052, 1054, 1056). The machine-readable storage medium (1050) can store data, programs, instructions, or any other machine-readable data that can be utilized to operate the 3D printed sensor system (FIG. 1, 100). Machine-readable storage medium (1050) can store computer readable instructions that the processor of the controller (FIG. 1, 106) can process, or execute. The machine-readable storage medium (1050) can be an electronic, magnetic, optical, or other physical storage device that contains or stores executable instructions. Machine-readable storage medium (1050) may be, for example, Random Access Memory (RAM), an Electrically Erasable Programmable Read-Only Memory (EEPROM), a storage device, an optical disc, etc. The machine-readable storage medium (1050) may be a non-transitory machine-readable storage medium (1050). The machine-readable storage medium (1050) is not a wave.

Referring to FIG. 10, the machine-readable storage medium (1050) includes instructions (1052), which when executed by the processor, cause the processor to determine (1052) a first capacitance from a measurement of a first three-dimensional (3D) printed sensor (FIG. 1, 104) on a surface of a 3D printed object (FIG. 1, 102).

The machine-readable storage medium (1050) also contains instructions, which, when executed by the processor, cause the processor to determine (1054) a second capacitance from a measurement of a calibration sensor (FIG. 2, 208) on an interior of the 3D printed object (FIG. 1, 102).

The machine-readable storage medium (1050) also contains instructions, which, when executed by the processor, cause the processor to determine (1056) from a mapping between capacitance and humidity values, a humidity at the first 3D printed sensor based on the first capacitance and second capacitance.

Such systems and methods 1) allow for printing of electronic sensors in a 3D printed object; 2) simplify the incorporation of electronic components into a 3D printed object by lessening the number of components placed in/on the 3D printed object; 3) reduce the design constraints caused from placing lumped sensor components in/on the 3D printed object; and 4) facilitate the printing of the full range of sensors, with these sensors being oriented in the x-y plane of the 3D printed object, the z-direction, or any orientation within the 3D printed object. However, it is contemplated that the systems and methods disclosed herein may address other matters and deficiencies in a number of technical areas.

What is claimed is:

1. A three-dimensional (3D) printed sensor system comprising:
- a 3D printed object;
- a 3D printed sensor on a body of the 3D printed object, the 3D printed sensor comprising a dielectric region disposed between electrodes,
  - wherein a capacitance of the dielectric region is indicative of an environmental condition of the 3D printed object, and
  - wherein the dielectric region is formed by an additive manufacturing process in which dielectric build material is deposited and selectively fused, on a layer-by-layer basis, such that fused together dielectric build material forms the dielectric region,
  - wherein upon formation by the additive manufacturing process the dielectric region includes fused dielectric build material and one or more than one of partially fused dielectric build material, underfused dielectric build material, unfused dielectric build material remaining in the dielectric region of the 3D printed sensor, wherein the one or more than one of the partially fused dielectric build material, the underfused dielectric build material, and the unfused dielectric build material correspond to a porosity to the dielectric region, wherein the porosity is selected to facilitate infiltration of a compound within the dielectric region, and wherein the dielectric build material is selectively fused to have an amount of the one or more than one of the partially fused dielectric build material, the underfused dielectric build material, and the unfused dielectric build material corresponding to the selected porosity; and a controller integrated with the body of the 3D printed object, the controller to measure the capacitance of the dielectric region, wherein the controller applies voltages to the electrodes of the 3D printed sensor such that the capacitance is measured, and wherein the capacitance is based on the infiltration of the compound within the dielectric region.

2. The 3D printed sensor system of claim 1, wherein:

the 3D printed sensor is formed on a surface of the 3D printed object; and the 3D printed sensor follows a contour of a curved surface of the 3D printed object.

3. The 3D printed sensor system of claim 1, further comprising one or more than one of:

a power supply;

a storage device to store measured capacitance values;

a communication device to transmit the measured capacitance values; and a calibration sensor comprising a calibration dielectric region disposed between calibration electrodes to provide a calibration value.

4. The 3D printed sensor system of claim 3, wherein the calibration sensor is internal to the body of the 3D printed object.

5. The 3D printed sensor system of claim 1, wherein the controller is to transmit the capacitance of the dielectric region.

6. The 3D printed sensor system of claim 1, wherein:

the dielectric region of the 3D printed sensor is to absorb a non-water chemical; and absorption of the non-water chemical produces a change in the capacitance of the dielectric region.

7. The 3D printed sensor system of claim 1, wherein:

the 3D printed sensor comprises polyamide 12;

the dielectric region of the 3D printed sensor comprises barium titanate; and the electrodes of the 3D printed sensor comprise silver nanoparticles.

8. A method comprising:

measuring a capacitance of a dielectric region of a three-dimensional (3D) printed humidity sensor on a surface of a 3D printed object, wherein the capacitance is indicative of a humidity condition of the 3D printed object, wherein the 3D printed humidity sensor includes the dielectric region disposed between electrodes, wherein the dielectric region is formed by an additive manufacturing process in which dielectric build material is deposited and selectively fused, on a layer-by-layer basis, such that fused together dielectric build material forms the dielectric region, wherein upon formation by the additive manufacturing process the dielectric region includes fused dielectric build material and one or more than one of partially fused dielectric build material, underfused dielectric build material, unfused dielectric build material remaining in the dielectric region of the 3D printed humidity sensor, wherein the one or more than one of the partially fused dielectric build material, the underfused dielectric build material, and the unfused dielectric build material corresponds to a porosity to the dielectric region, wherein the porosity is selected to facilitate infiltration of a compound within the dielectric region, wherein a controller integrated with a body of the 3D printed object applies voltages to the electrodes of the 3D printed humidity sensor such that the capacitance is measured, and wherein the capacitance is based on the infiltration of the compound within the dielectric region; and determining, from a database, a humidity for the 3D printed object based on the capacitance of the dielectric region.

9. The method of claim 8, further comprising forming the 3D printed humidity sensor, including, for each of a plurality of layers of the dielectric region:

depositing a layer of the dielectric build material;

selectively depositing fusing agent on the deposited layer of the dielectric build material where the dielectric build material is to fuse together within a corresponding layer of the dielectric region;

applying energy to the layer of the dielectric build material on which the fusing agent has been selectively deposited, to selectively fuse the dielectric build material together to form to form the corresponding layer of the dielectric region.

10. The method of claim 8, further comprising measuring a capacitance from a calibration 3D printed humidity sensor, wherein determining the humidity for the 3D printed object comprises:

calculating a difference between the capacitance of the dielectric region and the capacitance measured from the calibration 3D printed humidity sensor; and offsetting a humidity measurement based on the calculated difference.

11. The method of claim 8, further comprising:

determining a structure of the dielectric region of the 3D printed humidity sensor, wherein the humidity is determined based on the structure of the dielectric region in addition to the capacitance of the dielectric region.

12. The method of claim 8, wherein the 3D printed humidity sensor is one of a plurality of 3D printed humidity sensors on the surface of the 3D printed object, wherein a capacitance of each 3D printed humidity sensor is measured, and wherein the humidity is determined based on the capacitance of every 3D printed humidity sensor.

13. A non-transitory machine-readable storage medium storing instructions that when executed by a processor, cause the processor to:

determine a first capacitance from a measurement of a three-dimensional (3D) printed sensor integrated on a 3D printed object, wherein the 3D printed sensor includes a dielectric region disposed between electrodes, wherein the dielectric region is formed by an additive manufacturing process in which dielectric build material is deposited and selectively fused, on a layer-by-layer basis, such that fused together dielectric build material forms the dielectric region, wherein upon formation by the additive manufacturing process the dielectric region includes fused dielectric build material and one or more than one of partially fused dielectric build material, underfused dielectric build material, unfused dielectric build material remaining in the dielectric region of the 3D printed sensor, wherein the one or more than one of the partially fused dielectric build material, the underfused dielectric build material, and the unfused dielectric build material corresponds to a porosity to the dielectric region, wherein the porosity is selected to facilitate infiltration of a compound within the dielectric region, wherein a controller integrated with a body of the 3D printed object applies voltages to the electrodes of the 3D printed sensor such that the first capacitance is measured, and wherein the first capacitance is based on the infiltration of the compound within the dielectric region;

determine a second capacitance from a measurement of a calibration sensor on an interior of the 3D printed object; and determine, from a mapping between capacitance and humidity values, a humidity at the 3D printed sensor based on the first capacitance and the second capacitance.

14. The non-transitory machine-readable storage medium of claim 13, wherein the mapping is indexed by physical characteristics of the 3D printed sensor.

* * * * *